Nov. 27, 1962 A. BESSLER ET AL 3,065,829
SEGMENT-TYPE DISK BRAKE AND HYDRAULIC
CYLINDER ARRANGEMENT THEREFOR
Filed June 29, 1960 2 Sheets-Sheet 1

INVENTORS:
ALFRED BESSLER, HEINZ RABE,
HEINZ DOBBELSTEIN, HERMANN VON EY
BY
Mestern & Rollin
ATTORNEYS

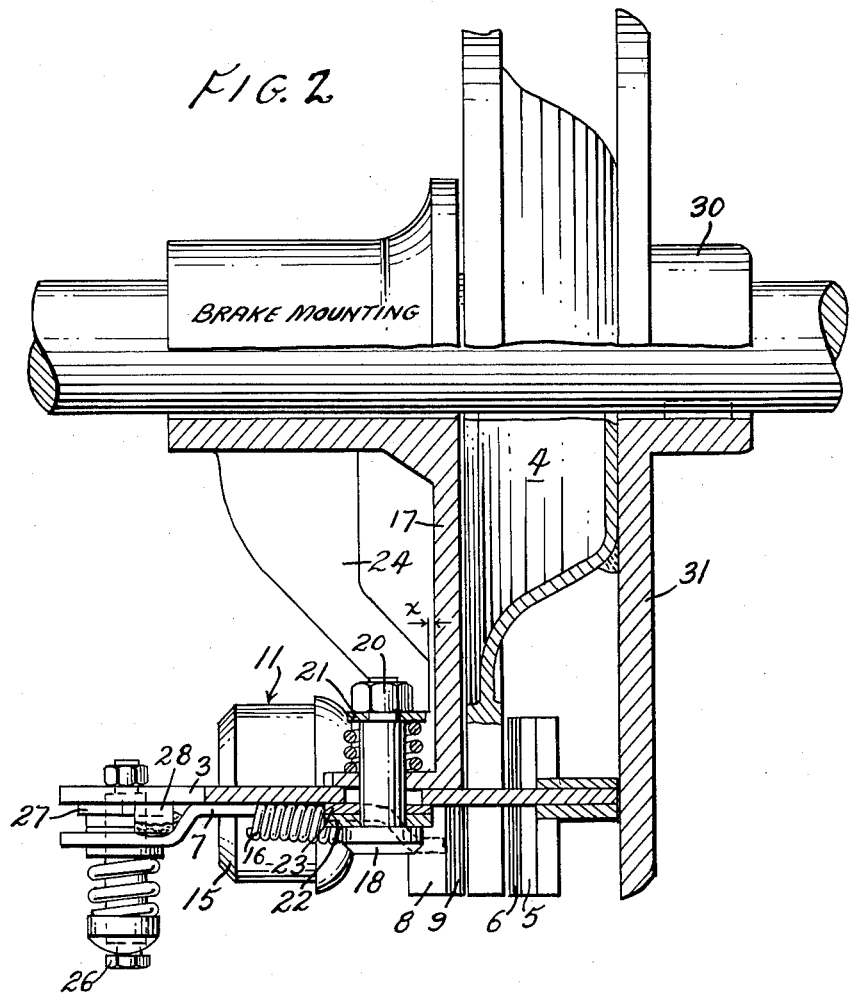

United States Patent Office 3,065,829
Patented Nov. 27, 1962

3,065,829
SEGMENT-TYPE DISK BRAKE AND HYDRAULIC CYLINDER ARRANGEMENT THEREFOR
Alfred Bessler, Heinz Rabe, Heinz Dobbelstein, and Hermann von Ey, all of Gifhorn, Hannover, Germany, assignors to Alfred Teves Maschinen- und Armaturenfabrik K.G., Frankfurt am Main, Germany
Filed June 29, 1960, Ser. No. 39,574
Claims priority, application Germany July 7, 1959
4 Claims. (Cl. 188—73)

The invention relates to an improved segment-type disk brake and to an arrangement of hydraulic cylinders in such and kindred devices.

A known mechanically or hydraulically actuated segment disk brake comprises two flat integral frames of plate construction to support the brake facings, one frame being attached to its mounting and the other frame sliding against the internal edges of the first frame. The brake is attached to two bracket tabs of the mounting, both in sliding contact with the underside of the facing-support frame embracing the disk. The frame transmits brake action by means of guide flanges. The other plate frame is offset in such a manner that it can slide on the underside of the frame embracing the brake disk, while its outer edges transmit brake pressure to the inner edges of the first frame. In addition, the brackets are connected to the frame embracing the brake disk, and the two frames to each other, by means of spring-mounted bolts. The spring-mounted bolt connecting the two frames to each other serves as a friction-adjusting device. Such a segment disk brake is described in our application Serial No. 25,032 filed April 27, 1960.

Such a conventional friction-adjusting means affords a predetermined brake clearance for one facing only. The other slides idly against the brake disk in released position. This trailing of brake facing against brake disk entails the disadvantages of evolution of heat, rapid wear, and occurrence of rattling and flapping noises. The trailing facing will wear more rapidly than the one drawn clear of the disk and must therefore be replaced sooner and oftener, unless indeed the other facing is discarded with it, by preference, while still usable.

One object of the invention therefore is to provide an improved segment disk brake in which brake clearance is afforded also for the side of the disk otherwise remaining in loose engagement after release, by incorporation of a friction-adjusting device. To achieve this object, according to the invention, one or both of the spring bolts connecting the disk-embracing frame to the brackets are employed for the friction adjustment, and a stationary part of the machine to be braked is fitted with a stop restricting the axial deflection of the brake mounting during brake action to the amount of the brake clearance. The oblong hole or slot receiving the spring bolt to permit sliding motion between the frame and the brackets may according to the invention be either in the bracket or in the frame. The bolt, by the force of the compression spring on which it purchases, holds a friction washer against the outside of the part having the oblong hole, the action of the spring being so correlated with the resiliency of the support plate that the frame will shift relatively to the bracket when the brake-support plate strikes the stop in the course of brake actuation, and not until then. A particular advantage of this arrangement is its economical employment of simple means. All that need be added to the spring bolt is the friction washer and the stationary stop.

In known hydraulic brakes, hydraulic cylinders are commonly arranged between the adjacent ends of the shoes of a drum brake, or between the facing supports of disk brakes, the brake cylinder being attached to the mounting by bolted, welded or like connections. Floating installation of brake cylinders so as to pivotable or otherwise movable between the supports of the brake linings has also been proposed. In either case, special fastening means are necessary.

Accordingly, another object of the invention is to eliminate such special fastening means by utilizing the difference between the tension of the restoring springs and the force of a precompression maintained in the brake system to enable a hydraulic cylinder to engage grooves or the like in it and in its piston with the corresponding inner extremities of the shoes, facing supports or the like at their mutual distance in released position.

The device according to the invention will now be more fully described with reference to the accompanying drawing, but it should be understood that the same is given by way of illustration and not of limitation and that many changes in the details may be made without departing from the spirit of the invention.

In the drawing:

FIG. 2 shows a partial section at the line II—II of FIG. 1.

Figure 1:
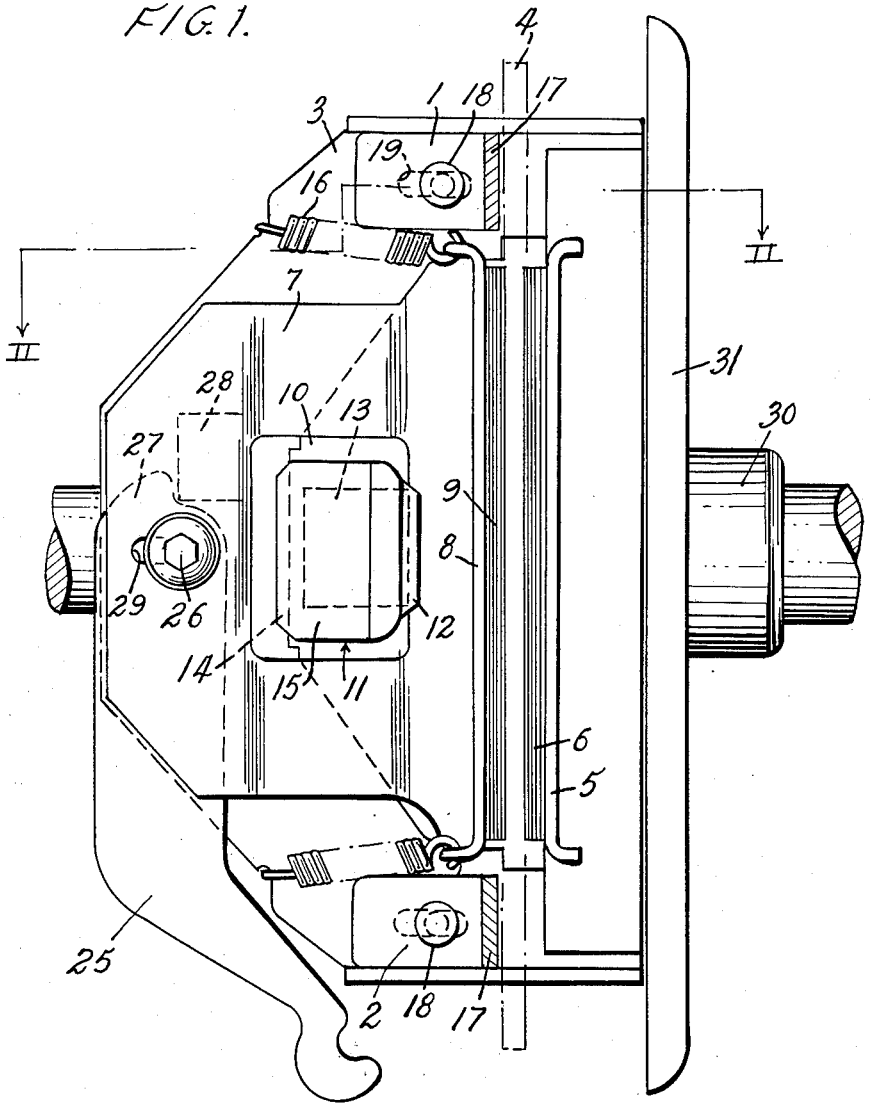
FIG. 1 shows a bottom view of a segment disk brake with hydraulic cylinder arranged according to the invention.

To the bracket tabs 1 and 2 of the brake mounting is attached the facing-support frame 3 which has a large opening embracing the brake disk 4 while carrying a facing support 5 and its brake facing or lining 6; frame 3, which carries the other facing-support frame 7 with its facing support 8 and facing or lining 9, has a smaller opening which registers with the opening of frame 3 to form a space 10 accommodating a hydraulic cylinder 11. The latter, by means of a groove 12 in piston 13 and a groove 14 in the cylinder 15 proper, engages the inner edges of frames 3 and 7 respectively. Restoring springs are indicated at 16. Disk 4 is rigid with the hub 30 of a vehicle wheel 31.

A compression maintained in the brake system, for example by means of a known precompression valve or an accumulator in the system, serves to hold the cylinder floatingly in position during piston displacements against the aforementioned frame edges, thus eliminating the need for special cylinder-fastening means.

Each of the bracket tabs 1, 2 of the brake mounting 17 is drilled to receive a bolt 18; as illustrated in FIG. 2 for the tab 2. Frame 3 is provided with an oblong hole or slot 19 affording enough room for motion to compensate wear. The bolt 18 applies the force of spring 20 through washers 21 and 22 to hold friction washer 23, frame 3 and bracket 1 or 2 together. A stop 24 is attached to a stationary part, not shown, of the machine to be decelerated by the brake. For manually operating the brake we provide a mechanism similar to that disclosed in our copending application Ser. No. 25,032, comprising a control lever 25 which is pivotable about a bolt 26 on frame 3 and has a spur 27 bearing upon a lug 28 on frame 7 to bring about a relative displacement of the two frames against the force of restoring springs 16, frame 7 being provided for this purpose with a slot 29 traversed by the bolt 26.

Since in released condition of the brake there is a distance $x$ representing the clearance between the brake mounting 17 and the stop 24, displacement of the two frames 3, 7 relative to each other, either normally by lever 25 or fluid control via piston 13 and cylinder 15, will at first elastically deflect the brake mounting 17 which on contact with stop 24 closes up the brake clearance $x$. The spring 20 is so arranged that friction between washer 23, frame 3 and bracket 1 or 2 is not overcome, in the course of deflection of the brake mounting, until the latter strikes the stop 24. Only then will frame 3 be able to slide on bracket 1 or 2 and place the facing 6 in locking engagement with the disk 4. Wear of facing 6 will be taken up in the course of the brake application.

After release of the brake, the brake mounting 17 will recoil towards the disk 4 by the distance $x$, taking with it the friction-adjusting device 7—23 and the frame 3 with attached support 5 and facing 6, thus creating a brake clearance equal to the extent of its deflection.

What we claim is:

1. A brake assembly comprising a disk coupled with an object to be braked and rotatable relatively to a mounting, a first frame encompassing a chord of said disk, a second frame positioned adjacent said first frame for displacement relative thereto and adjacent said disk, first and second support means respectively mounted on said frames alongside opposite faces of said disk, brake linings carried on said support means adjacent said disk faces for respective contact therewith upon a relative displacement of said frames in one sense, control means interposed between and bearing upon said frames and operable to displace same in said one sense, restoring means tending relatively to displace said frames in the opposite sense, support means on said mounting for one of said frames resiliently displaceable from a normal position, frictional coupling means joining said one of said frames to said support means for entraining the latter, and stop means on said mounting engageable with said support means for limiting the entrainment of the latter by said one of said frames upon the operation of said control means, said coupling means entraining said support means into contact with said stop means and thereafter enabling further motion of said one of said frames in response to said control means for bringing the brake lining thereof to bear upon the corresponding disk face, said support means upon deactivation of said control means retracting the last-mentioned brake lining from said disk by returning to said normal position.

2. A brake assembly comprising a disk coupled with an object to be braked and rotatable relatively to a mounting, a first flat frame encompassing a chord of said disk, a second flat frame positioned adjacent said first frame for displacement relative thereto and adjacent said disk, first and second support means respectively mounted on said frames alongside opposite faces of said disk, brake linings carried on said support means adjacent said disk faces for respective contact therewith upon a relative displacement of said frames in one sense, fluid-actuated control means interposed between and bearing upon said frames and operable to displace same in said one sense, restoring means tending relatively to displace said frames in the opposite sense, support means on said mounting for one of said frames resiliently displaceable from a normal position, frictional coupling means joining said one of said frames to said support means for entraining the latter, and stop means on said mounting engageable with said support means for limiting the entrainment of the latter by said one of said frames upon the operation of said control means, said coupling means entraining said support means into contact with said stop means and thereafter enabling further motion of said one of said frames in response to said control means for bringing the brake lining thereof to bear upon the corresponding disk face, said support means upon deactivation of said control means retracting the last-mentioned brake lining from said disk by returning to said normal position.

3. A brake assembly according to claim 2 wherein said frames are provided with openings partially registering with each other, thereby forming a space adapted to accommodate said control means, the latter including a cylinder and a piston in said cylinder, said piston and said cylinder being floatingly received in said space and bearing upon respective edges of said frames bounding said space.

4. A brake assembly according to claim 2 wherein said support means comprises a stationary mounting for said disk provided with a resilient arm, said one of said frames having a portion overlying a portion of said arm, said coupling means including a bolt passing through said portions and spring means on said bolt urging said portions into contact with each other, one of said portions having a slot traversed by said bolt for enabling relative displacement of said portions.

References Cited in the file of this patent

UNITED STATES PATENTS 2,531,341    Meador    Nov. 21, 1950

FOREIGN PATENTS 1,017,034    Germany    Oct. 3, 1957
578,038    Great Britain    June 12, 1946
587,306    Great Britain    Apr. 21, 1947